United States Patent

[11] 3,575,666

[72] Inventors Martin Fischman
Wantagh;
John Matarese, New City, N.Y.
[21] Appl. No. 839,205
[22] Filed July 7, 1969
[45] Patented Apr. 20, 1971
[73] Assignee General Telephone & Electronics Laboratories, Incorporated

[54] TELEVISION SYNCHRONIZING SYSTEM USING A PHASE CONTROLLED GYRATOR FILTER
12 Claims, 4 Drawing Figs.

[52] U.S. Cl. .......... 331/20, 178/69.5, 331/25, 331/165, 331/167, 331/173, 333/76, 333/80
[51] Int. Cl. .......... H03b 3/04, H04l 7/08
[50] Field of Search .......... 331/20, 18, 25, 165, 167, 172, 173; 333/76, 80; 328/223; 178/69.5

[56] References Cited

UNITED STATES PATENTS 2,773,189 12/1956 Janssen .......... 331/20X
2,945,136 7/1960 Poirier .......... 333/76X
3,501,716 3/1970 Ferch et al. .......... 333/80

*Primary Examiner*—John Kominski
*Assistant Examiner*—Siegfried H. Grimm
*Attorneys*—Robert J. Frank and Amster and Rothstein

ABSTRACT: A horizontal synchronizing system for a television receiver. The sync pulses are applied to a tuned circuit consisting of a capacitor and a gyrator-simulated inductor. The resulting signal in the tuned circuit is used to control the derivation of the horizontal sawtooth waveform. The use of a gyrator allows the entire circuit to be fabricated by integrated circuit techniques, and also minimizes the possibility of side locking or spurious synchronization at multiples of 60 Hz. off the horizontal scanning frequency by eliminating the need for the conventional horizontal oscillator. This arrangement results in a phase difference between the sawtooth waveform and the sync pulses, but this phase difference is eliminated by the provision of a phase adjust circuit. A phase detector and control circuit which changes the resonant frequency of the tuned circuit by adjusting one of the gyrator impedances minimizes spurious phase shifting and ensures a stable picture. The gyrator also operates in a second mode to provide a horizontal scan in the absence of sync pulses.

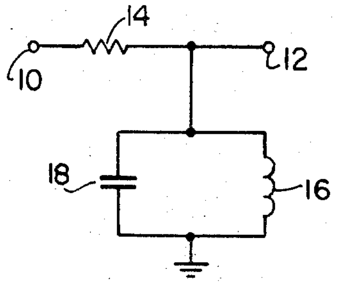
FIG. 1
FIG. 2A
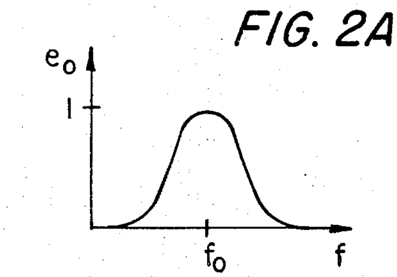
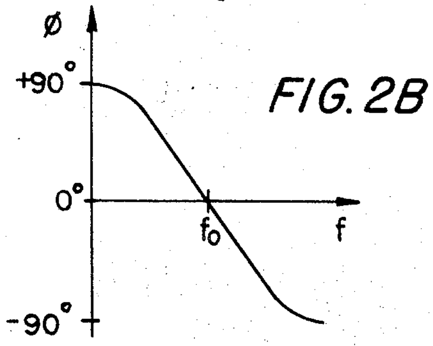
FIG. 5
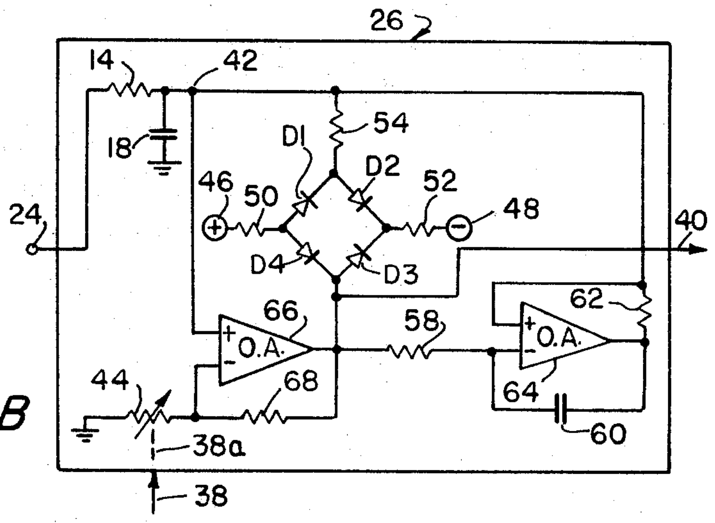
FIG. 3
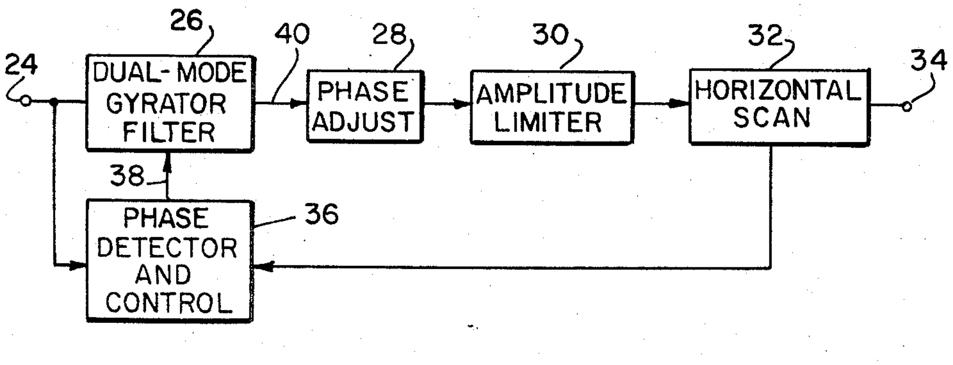
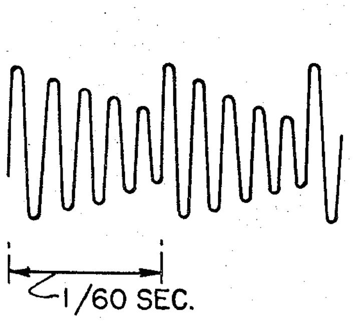
FIG. 4
*INVENTORS*
MARTIN FISCHMAN
JOHN MATARESE
Amster & Rothstein
ATTORNEYS

TELEVISION SYNCHRONIZING SYSTEM USING A PHASE CONTROLLED GYRATOR FILTER

This invention relates to television synchronizing systems, and more particularly to an inductorless synchronizing system suitable for fabrication in the form of an integrated circuit.

In a typical present-day television receiver, the horizontal sync pulses control the frequency of a horizontal oscillator which in turn feeds the horizontal output stage. This is not sufficient, however, for proper scanning because while the frequencies of the incoming sync pulses and the horizontal oscillator may be the same, they may have different phases. A phase difference results in the shifting of the picture to the left or the right on the television screen. For this reason, a phase adjusting circuit is also provided for ensuring that the phase of the horizontal oscillator equals that of the sync pulses.

For the same reasons that many electronic systems are today made in the form of integrated circuits, it is apparent that it would be advantageous to similarly fabricate a television horizontal synchronizing system as an integrated circuit. However, this is not feasible at the present time because a typical horizontal oscillator in a synchronizing system includes an inductor as part of a circuit tuned to the horizontal frequency of 15,734.26 Hz., and there are no satisfactory methods for making an inductor in an integrated circuit.

It is a general object of our invention to provide a horizontal synchronizing system which does not require the use of an inductor and is therefore suitable for fabrication by integrated circuit techniques.

It is another object of our invention to provide a horizontal synchronizing system which is more stable than conventional horizontal synchronizing systems.

Early in the development of television receivers, it was proposed to use a tuned circuit (parallel combination of an inductor and a capacitor) and to apply to it the incoming horizontal sync pulses. In such a system, the resulting signal controls the operation of the horizontal output stage. The resonant frequency of the tuned circuit is nominally equal to the horizontal scan frequency. The resonant frequency of the tuned circuit actually changes slightly as the component values change (with temperature, time, etc.), but the signal frequency is determined by the frequency of the sync pulses. To render the tuned circuit insensitive to noise pulses, the Q of the tuned circuit should be high. However, in a high Q filter even slight detuning can cause severe phase shift in the output signal. Because it is difficult to guard against noise at the same time that phase drift is kept to a minimum, this type of horizontal synchronizing system was not adopted.

In accordance with the principles of our invention, the earlier proposed tuned circuit is used in a horizontal synchronizing system. In order that the system be capable of fabrication by integrated circuit techniques, the prior art inductor is replaced by a gyrator. The gyrator in effect transforms a capacitance into an inductance without requiring the use of any inductors. Furthermore, a gyrator is capable of simulating an inductor with an exceedingly large Q factor. It therefore becomes possible, in accordance with the principles of our invention, to use a tuned circuit which provides maximum noise immunity. As described above, however, the high Q tuned circuit may present phase drift problems. For this reason, we provide a phase detector and control circuit for ensuring that the phase of the horizontal scanning signal is maintained equal to that of the horizontal sync pulses.

There is another problem, however, with the use of a tuned circuit in the manner proposed. In the event no sync pulses are applied to the circuit, the signal in the circuit is not sustained. In the absence of the horizontal scan and assuming that the vertical deflection circuit still operates in its normal manner, the picture collapses to a vertical line on the television screen. This line is visible, for example, while stations are being switched or when a selected station is off the air and there are no sync pulses since there is no television signal in the first place. It has been found that there is a consumer objection to the loss of a relatively white-looking screen and the substitution for it of a vertical line. More important, with the failure of a drive to the horizontal output stage serious damage may result to that stage. Furthermore, when the sync pulses are once again received, there may be a delay in the picture display (even if the horizontal output stage has not been damaged).

For this reason, in accordance with an aspect of the present invention, we provide a feedback circuit in the gyrator network which, in the absence of incoming sync pulses, causes the gyrator tuned circuit to oscillate at a frequency having a nominal value equal to the standard horizontal sync frequency. In the presence of horizontal sync pulses, the self-sustained oscillatory signal has a negligible effect on the horizontal scanning. In the absence of incoming sync, however, the self-sustained oscillatory signal provides the same type of operation as that of the horizontal oscillator in a present-day television receiver when no incoming sync pulses are detected.

Further objects, features and advantages of our invention will become apparent upon consideration of the following detailed description in conjunction with the drawing, in which:

FIG. 1 depicts a tuned circuit which will be helpful in understanding the invention;

FIGS. 2A and 2B depict the attenuation and phase characteristics of the tuned circuit of FIG. 1;

FIG. 3 depicts in block diagram form an illustrative embodiment of the invention;

FIG. 4 depicts the output signal from phase adjust circuit 28 in FIG. 3; and

FIG. 5 is a detailed schematic of a circuit suitable for use as the dual-mode gyrator filter 26 of FIG. 3.

FIG. 1 depicts a conventional tuned circuit whose characteristics, shown in FIGS. 2A and 2B, are well known to those skilled in the art. The tuned circuit, consisting of inductor 16 and capacitor 18 connected in parallel, exhibits a resonant frequency $f_o$. Input terminal 10 is connected through resistor !4 to the tuned circuit, and the output at terminal 12 is taken across the circuit. (The purpose of the resistor is to isolate the tuned circuit from the input terminal so that the Q of the filter is not reduced as a result of loading by the input source.) If a periodic signal is applied at input terminal 10, a sine wave signal $e_o$ of the same frequency appears at output terminal 12. However, the amplitude of the output signal varies with the difference between the input signal frequency and the resonant frequency of the tuned circuit. Referring to FIG. 2A, the horizontal axis represents the frequency of the input signal and the vertical axis represents the amplitude of the output signal. If the input frequency equals the resonant frequency $f_o$, the tuned circuit exhibits a maximum impedance and the output amplitude is a maximum. As the input frequency varies from the resonant frequency, the amplitude of the output falls off. At frequencies very far from the resonant frequency, the tuned circuit presents a very low impedance to the input signal and the output signal is severely attenuated.

FIG. 2B shows the relative phases of the input and output signals, the vertical axis representing the number of degrees by which the output signal leads the input signal. If the input signal has a frequency $f_o$, there is no phase shift because the tuned circuit is effectively a pure resistance. At frequencies below $f_o$ the output signal leads the input signal, and at frequencies above $f_o$ the output signal lags the input signal. At frequencies very far from the resonant frequency, the phase shift approaches either maximum, +90° or −90°.

As described above, it was proposed previously to use a tuned circuit, excited by the horizontal sync pulses, in the horizontal synchronizing system of a television receiver. In such a system, sync pulses are supplied to the tuned circuit, and the resulting signal in the tuned circuit is at the frequence of the sync pulses. The signal can then be used to drive the horizontal output circuit. (Typically, the sine wave at terminal 12 would be clipped to form a square wave, and the square wave would then be used to derive the necessary sawtooth waveform required for the horizontal deflecting plates.) The problem with this kind of system is that it suffers from noise interference if its selectivity is low and from phase drift if its selectivity is high. A noise pulse is treated as a sync pulse and can seriously disrupt the signal at terminal 12. The effect of noise pulses can be suppressed by providing a tuned circuit with a high Q factor (high selectivity). With a high Q factor, the curve of FIG. 2A would be compressed along the horizontal axis so that the bandwidth around the resonant frequency would be reduced. This would in turn minimize the effect of any noise pulse occurring out of step with the incoming sync pulses at terminal 10. However, the effect of compressing the curve of FIG. 2A is to compress the curve of FIG. 2B in a similar manner. The important characteristic of FIG. 2B is the slope of the curve at the resonant frequency. It is apparent that the greater the slope, the greater the difference in phase between the input and output signals for any given deviation of the input frequency from the resonant frequency. With a high Q filter, the slope of the curve of FIG. 2B at the resonant frequency becomes so large that even small deviations between the input and the resonant frequencies result in relatively large phase shifts between the input and output signals. Since the resonant frequency of the tuned circuit necessarily changes slightly with temperature, etc., it is apparent that there can develop a relatively large phase shift between the input and output signals. A phase shift of only 6° would shift the picture to the left or the right by a factor of 6/360, or 1/60. If the width of the screen is 12 inches, the shift would be (1/60)×(12) or 0.2 inch.

In the illustrative embodiment of the invention shown in FIG. 3, a tuned circuit (filter) 26 is used to control horizontal scanning. As will be discussed below with reference to FIG. 5, the filter has the advantage of not requiring an inductor so that the entire horizontal scanning system can be made in the form of an integrated circuit. The filter is derived from a gyrator network and therefore can possess a very high Q for maximum rejection of noise. Preferably, the Q of the filter is above 30. Of course, the high Q of the filter presents the phase-drift problem discussed above, but this is overcome with the use of a phase detector and control circuit 36.

The horizontal sync pulses are applied at terminal 24, after they are derived from the conventional sync separator in a television receiver. For the moment, dual-mode gyrator filter 26 can be considered to be of the type shown in FIG. 1. The tank circuit is excited by the horizontal sync pulses and the signal on conductor 40 is of the same frequency as the frequency of the sync pulses. For proper operation of a typical television receiver, the leading edges of the sync pulses and the zero crossings of the signal which drives the horizontal output stage must coincide. However, the zero crossings of the signal in filter 26 do not coincide with the leading edges of the sync pulses. For this reason, phase adjust network 28 is provided to introduce a fixed delay in the signal by an amount such that the zero crossings of the signal at the output of amplitude limiter 30 coincide with the leading edges of the sync pulses.

The signal at the output of phase adjust circuit 28 is of the form shown in FIG. 4. The frequency of the signal is that of the sync pulses. However, it is often found that the signal is amplitude modulated at the frequency of the vertical sync pulses, 60 Hz. To eliminate the 60-Hz. modulation, and any other noise, beats or interference about 15,734.26 Hz., the signal at the output of phase adjust network 28 is clipped by amplitude limiter 30. The resulting square wave signal delivered to horizontal scan circuit 32 has no amplitude modulation. The horizontal scan circuit can be any of many well-known types for developing a sawtooth horizontal deflecting voltage at terminal 34.

Although phase adjust network 28 is incorporated in the circuit to ensure that the phase of the signal at the output of amplitude limiter 30 is correct for a properly tuned filter, the resonant frequency of the filter does vary with temperature and time. As discussed above with reference to FIG. 2B, this can result in a varying phase drift, which cannot be compensated for by phase adjust network 28 which only introduces a fixed phase shift into the forward signal path. For this reason, phase detector and control circuit 36 is provided. This circuit can be any of many well-known types (often referred to as automatic frequency control circuits) and simply compares the phase of the sync pulses at terminal 24 to the phase of the sawtooth waveform produced by the horizontal scan circuit. A DC voltage is applied to conductor 38 depending on the relative phase difference between the two signals. This DC voltage adjusts the resonant frequency of the filter to maintain the proper phase of the signal at terminal 34.

Our use of phase detector and control circuit 36 should be distinguished from the use of similar circuits in the prior art. In the prior art, the phase control circuit was used to adjust the frequency of an oscillator. In the invention, the phase control circuit is used to adjust the phase of the output signal from a high Q tuned circuit.

FIG. 5 depicts an illustrative circuit for use in the block labeled 26 in FIG. 3. The circuit can be most readily understood by first neglecting the diode network (D1—D4) and the associated resistors and voltage supplies. Circuit 26 has three connections: the sync pulses are applied at terminal 24, a sinusoidal signal of the same frequency is produced on output conductor 40, and a DC voltage on conductor 38, as described above, is effective to change the resonant frequency of the filter. Referring back to FIG. 1, the input of the filter of FIG. 5 includes a resistor 14 and a capacitor 18. The filter of FIG. 5 would be comparable to that of FIG. 1 were output conductor 40 connected to the point designated 42 and an inductor connected between this point and ground, the inductor being comparable to inductor 16 in FIG. 1.

The circuitry in FIG. 5 including operational amplifiers 64 and 66 comprises a gyrator of the type described by R. H. S. Riordan in the Feb. 1967 issue of Electronics Letters, pp. 50-—51. In that reference, it is shown that if resistor 44 is a general impedance $Z_1$, resistor 68 is a general impedance $Z_3$, capacitor 60 is a general impedance $Z_4$ and resistor 62 is a general impedance $Z_5$, then the input impedance seen looking into the gyrator (at terminal 42) is equal to $Z_1Z_3Z_5/Z_2Z_4$. If all five impedances except $Z_4$ are resistors of magnitude R (that is, resistors 44, 68, 58 and 62 each have a magnitude R), then the input impedance is an inductance of magnitude $CR^2$, where C is the magnitude of capacitor 60 ($Z_4$). Thus the gyrator circuit effectively presents an inductor in parallel with capacitor 18 to produce a filter of the type shown in FIG. 1.

The circuit just described differs from that of FIG. 1 in that output conductor 40 is not connected to the junction of capacitor 18 and the gyrator-simulated inductor. Although conductor 40 could be so connected, to minimize loading of the filter (i.e., to maintain a high Q) the conductor is connected to the output of operational amplifier 66. The phase of the signal at the output of operational amplifier 66 is the same as the phase of the signal at terminal 42. A further advantage of taking the signal from the output of amplifier 66 is that the magnitude of the signal at this point is greater than the magnitude of the signal at terminal 42.

A major advantage of the circuit 26 shown in FIG. 5 is that it does not require the use of an inductor. Moreover, very high values of Q are obtainable with the use of a gyrator circuit and the overall system is very insensitive to noise. However, as mentioned above, because of the high value of Q small changes in the resonant frequency of the tuned circuit may introduce large phase shifts in the signal on conductor 40. It is apparent that any change in the component values of impedances 44, 68, 58, 60 and 62 will result in a different value of effective inductance and therefore a different resonant frequency. The effective value of inductance can be changed by controlling one of the impedances, such as resistor 44, in accordance with the DC signal on conductor 38. The control is shown only symbolically by dotted line 38*a*. Any of many well-known circuits can be used for this purpose, the common characteristic being that the impedance of element 44 is varied in accordance with the DC voltage on conductor 38.

Without the diode circuitry it is apparent that in the absence of sync pulses at terminal 24, there is no signal on conductor 40 since circuit 26 is equivalent to the circuit of FIG. 1—it is not an oscillator and there is no output signal in the absence of input sync pulses. If the circuit just described is used in a television receiver, the horizontal scan collapses while stations are being switched. This is not only annoying to many consumers, in many cases it can result in the destruction of some of the transistors in the horizontal scan circuit. For this reason, it is desirable to cause the circuit of FIG. 5 to oscillate in the absence of sync pulses. This is accomplished by feedback resistor 54 and the diode circuit.

In the absence of a sync input, the circuit of FIG. 5 oscillates at a low level. The basic gyrator circuit could be controlled to oscillate simply by placing resistor 54 between terminal 42 and the output of operational amplifier 66. Resistor 54 would serve to feed back the output of the operational amplifier to its input. The resistor should be relatively large in magnitude so as not to lower the Q of the circuit or to affect the filter action during receipt of sync pulses. However, no matter what the value of the resistor, without amplitude stabilization uncontrolled high-level oscillations could take place. The diode network limits the level of the oscillations.

If resistors 44 and 68 have the same magnitudes, the output voltage of operational amplifier 66 is twice the voltage at terminal 42. Initially, all four diodes are forward biased as a result of current flowing from source 46 through resistors 50 and 52 to source 48. As the voltage at terminal 42 approaches the magnitude of source 46, diode D1 becomes reverse biased. At the same time, the positive potential at the output of operational amplifier 66 is extended through diode D3 to the cathode of diode D2 (since the voltage at the output of the operational amplifier is greater than the voltage at terminal 42), and thus this diode turns off as well. Consequently, with both of diodes D1 and D2 reverse biased, resistor 54 is effectively disconnected from the output of the operational amplifier. Thus, the magnitude of the signal at terminal 42 cannot exceed the magnitude of source 46. Similarly, when a negative signal at terminal 42 approaches the magnitude of source 48, diodes D3 and D4 become reverse biased and the amplitude of the output signal is thus limited in the negative direction by the magnitude of source 48.

The feedback resistor 54, together with the diode network, allows low-level oscillations to be sustained even in the absence of sync pulses. In the presence of sync pulses, however, the low-level oscillations are not controlling due to the overriding locking action of the larger magnitude signal which results from the excitation of the filter. The circuit of FIG. 5 thus operates in a dual mode—as an ordinary tuned circuit of very high Q in the presence of sync pulses, and as a low-level oscillator in the absence of sync pulses.

Although the invention has been described with reference to a particular embodiment, it is to be understood that this embodiment is merely illustrative of the application of the principles of the invention. For example, other types of gyrators could be employed and a separate oscillator could be used to maintain the horizontal scan in the absence of sync pulses. Thus it is to be understood that numerous modifications may be made in the illustrative embodiment of the invention and other arrangements may be devised without departing from the spirit and scope of the invention.

We claim:

1. A synchronizing system comprising filter means, means for applying sync pulses to said filter means for producing a sine wave signal therein having a frequency equal to that of said sync pulses, scanning means, means for coupling said sine wave signal to said scanning means, said scanning means for producing a scanning signal having a frequency equal to that of said sine wave signal, and means responsive to a phase difference between said scanning signal and said sync pulses for changing the resonant frequency of said filter means to eliminate said phase difference.

2. A synchronizing system in accordance with claim 1 wherein said coupling means includes an amplitude limiter.

3. A synchronizing system in accordance with claim 1 wherein said coupling means includes a phase shift network.

4. A synchronizing system in accordance with claim 1 wherein said coupling means includes a phase shift network and an amplitude limiter.

5. A synchronizing system in accordance with claim 1 further including means for sustaining low-level oscillations in said filter means in the absence of sync pulses.

6. A synchronizing system in accordance with claim 4 further including means for sustaining low-level oscillations in said filter means in the absence of sync pulses.

7. A synchronizing system in accordance with claim 1 further including means for controlling the operation of said scanning means in the absence of sync pulses.

8. A synchronizing system in accordance with claim 7 wherein said filter means includes a capacitor and a gyrator-simulated inductor connected in parallel, and said controlling means includes feedback means in said gyrator-simulated inductor for controlling oscillations therein and means for limiting the magnitude of the voltage drop across said feedback means.

9. A synchronizing system in accordance with claim 8 wherein the Q of the filter means including said capacitor and said gyrator-simulated inductor is in excess of 30.

10. A synchronizing system in accordance with claim 1 wherein said filter means includes a capacitor and a gyrator-simulated inductor connected to exhibit the characteristics of a tuned circuit with a Q factor in excess of 30.

11. A dual-mode filter comprising capacitance means and inductance means connected to form a tuned circuit and normally operative responsive to pulse excitations for sustaining a signal therein at the frequency of said excitations, said inductance means including a capacitor and a gyrator for converting said capacitor to an inductor, and means in said gyrator for controlling oscillations in said tuned circuit in the absence of said excitations.

12. A dual-mode filter in accordance with claim 11 further including means for limiting the magnitude of the oscillations controlled by said last-mentioned means to a level below the level of the signal in the tuned circuit resulting from the normal excitations applied to said tuned circuit.